UNITED STATES PATENT OFFICE.

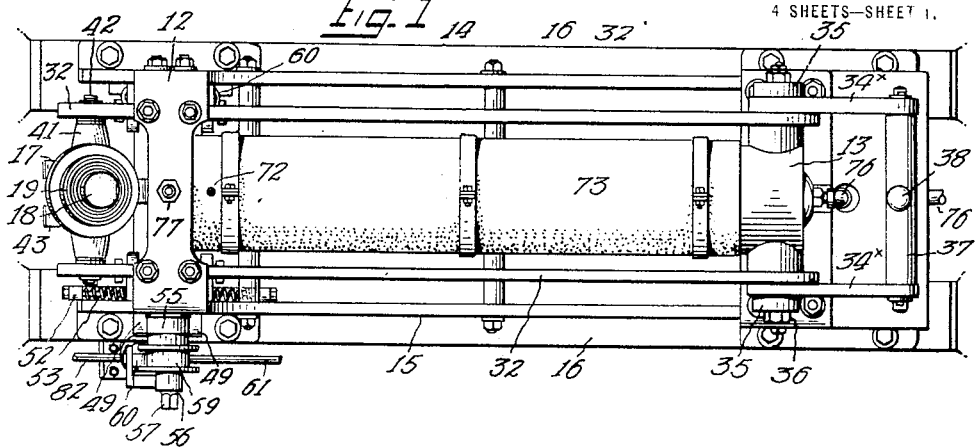

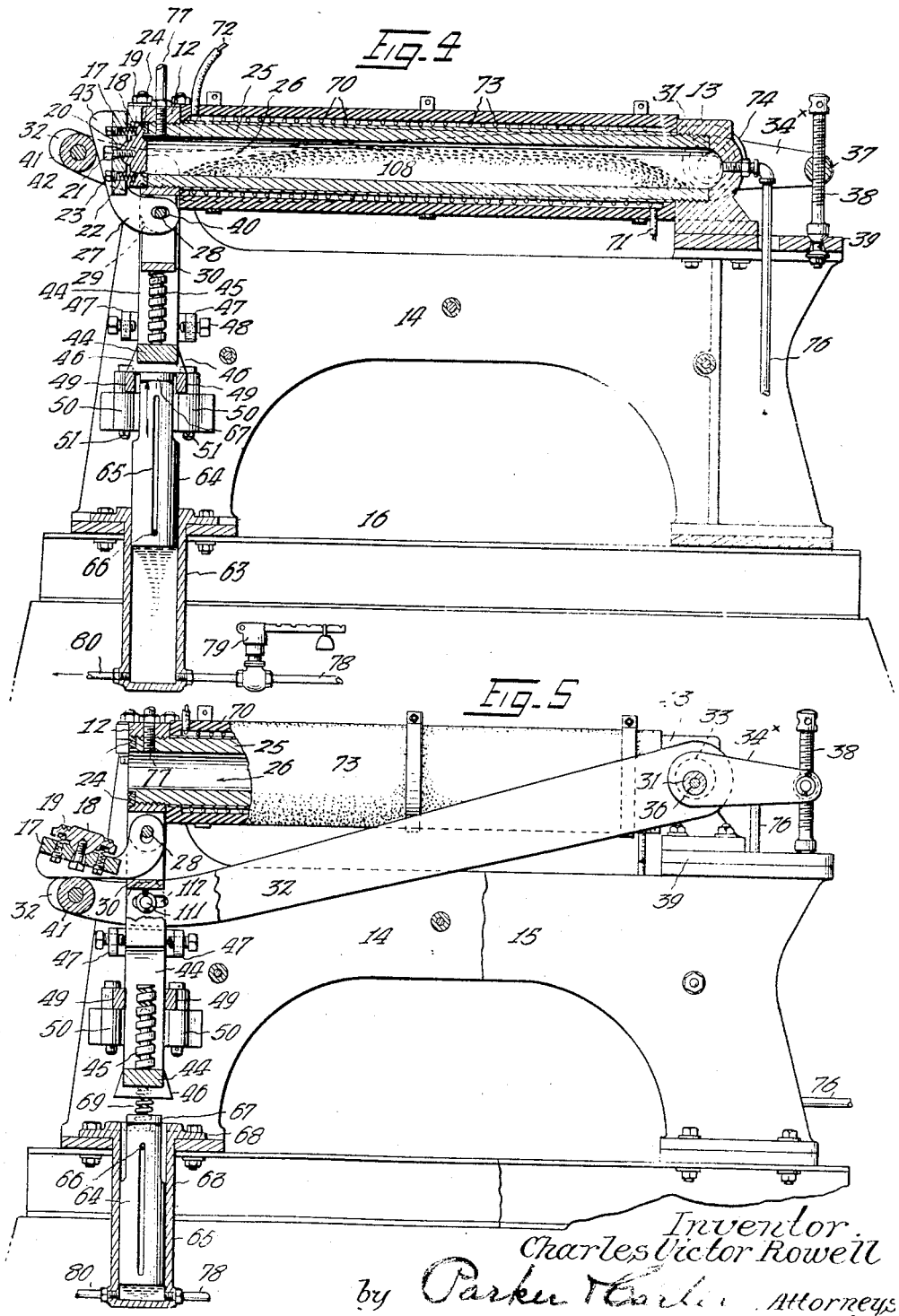

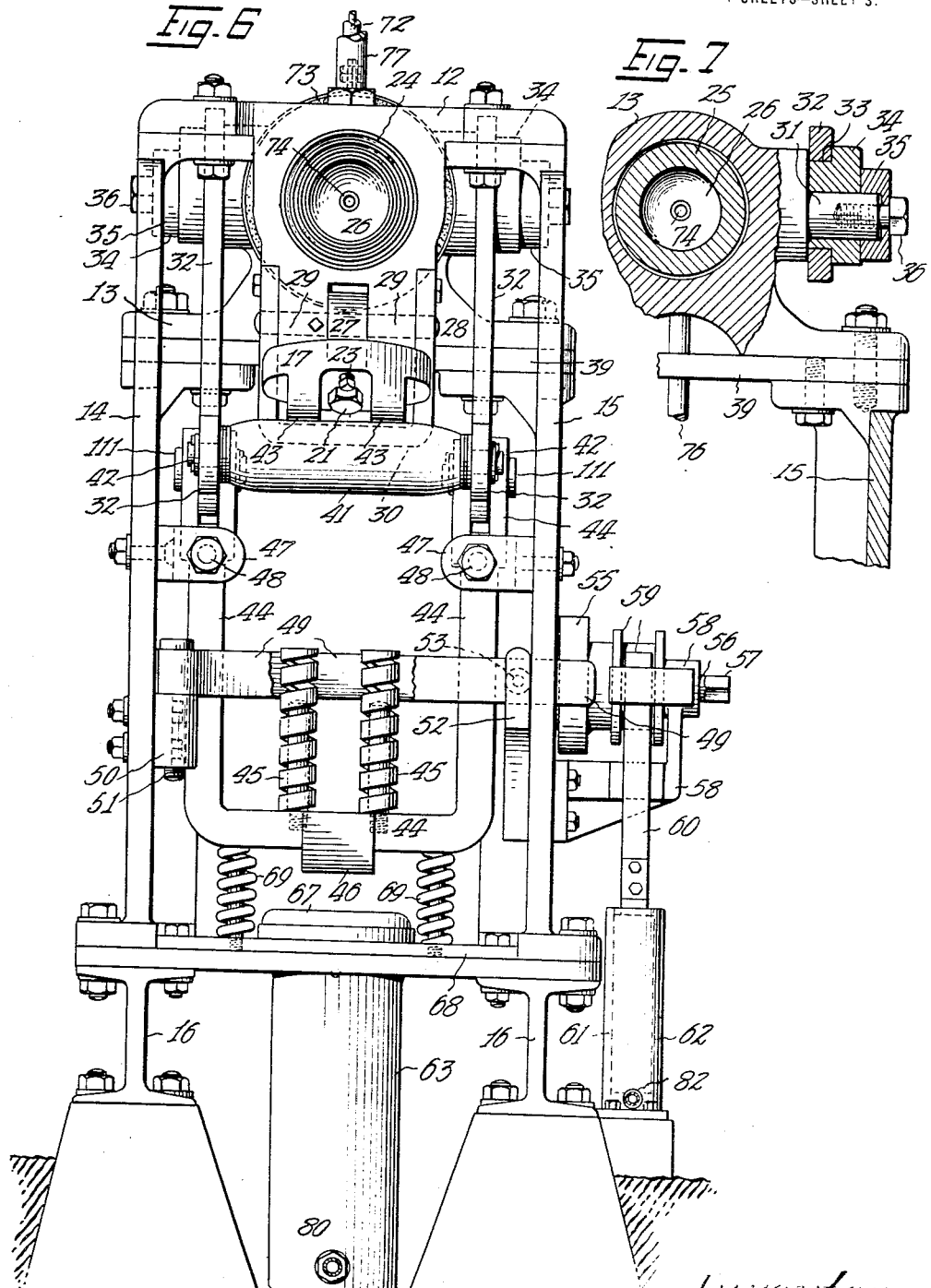

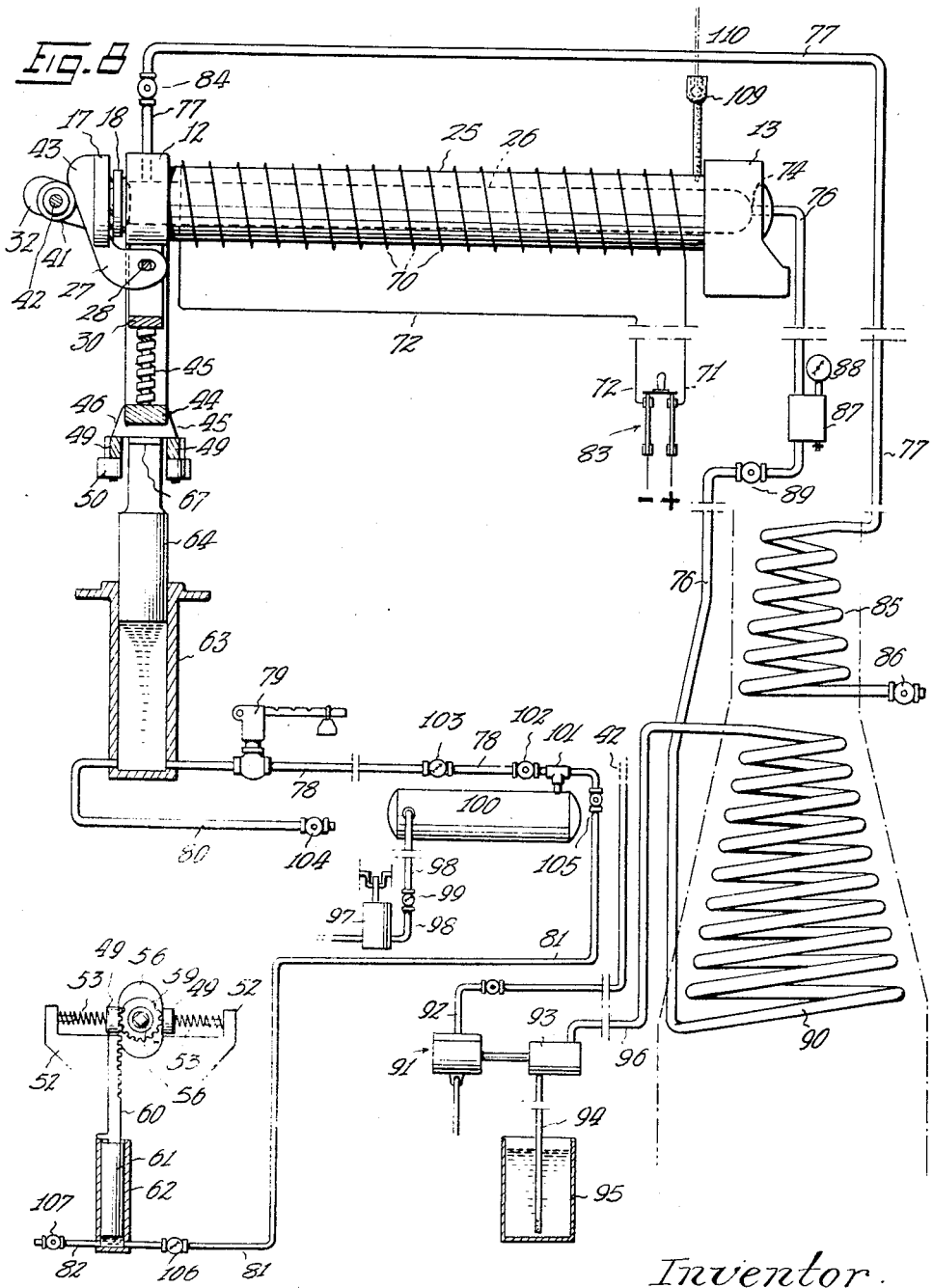

CHARLES VICTOR ROWELL, OF CROYDON, NEAR SYDNEY, NEW SOUTH WALES, AUSTRALIA.

ART OF TREATING WHEAT-GRAINS AND PRODUCT THEREFROM.

1,395,015.  Specification of Letters Patent.  Patented Oct. 25, 1921.

Application filed February 12, 1920. Serial No. 358,137.

*To all whom it may concern:*

Be it known that I, CHARLES VICTOR ROWELL, subject of the King of Great Britain and Ireland, residing at "Waitaki," Robinson street, Croydon, near Sydney, New South Wales, Australia, have invented new and useful Improvements in Art of Treating Wheat-Grains and Product Therefrom, of which the following is a specification.

This invention has for its object the manufacture of an improved food product from wheat grains without milling.

The product obtained by the process of treating wheat grains hereinafter described, consists of whole grains spread open along the crease, expanded to shapeless masses, ragged, flocculent, or spongy, and completely cooked, with the starch cells distended and ruptured, and the mass friable, white, almost dry, quite soft, and substantially liquescent in water or watery fluids or milk.

This product is distinguished from known varieties of processed wheat grains, which are incompletely cooked and retain the shape of the original grain with a somewhat gelatinized rubbery coat more or less covered with bran which imparts to it a superficial brownish tint, and the substance usually more or less affected in color, in that my product consists of completely cooked grain substances all substantially white though slightly tinged with color by fine particles of adherent bran but without superficially adhering bran, with the grain spread open along the crease, the cell structure disrupted and shattered, but the mass of the grains not dissevered though expanded to a shapeless ragged condition having a bulk very substantially greater per unit of weight. Furthermore, wheat processed by methods heretofore known exhibits light polarizing properties indicative of the presence of a substantial proportion of uncooked or partially cooked starch, while my product does not exhibit those properties, and in consequence of the changed condition of the starch in my product caused by complete cooking, my product displays very limited capacity for absorbing moisture from the atmosphere, whereas known types of processed wheat are absorbent of moisture from atmosphere so that considerable accretion in weight occurs after manufacture. The moisture found by analysis in samples of my product after exposure of several days in open atmosphere is usually within three per cent. and for a given weight its food value (as a whole wheat product) is a maximum.

My said product is manufactured by subjecting wheat in an air-dry state (in which according to prevailing conditions it usually carries 12-18 per cent. of water) to treatment in a closed chamber for a period of a few seconds under very high pressure and very high temperature in an atmosphere containing aqueous vapor, and suddenly opening the chamber at the conclusion of the treatment period, thereby releasing and permitting expansion of the gaseous contents of the cells and interstitial spaces in the grain so rapidly that the cells are fully ruptured and the original cellular structure of the grain is destroyed, without however, breaking the mass of the individual grains into separate fragments. A limited proportion of the grains are in fact broken by mechanical accident in the operation of the apparatus used, but nearly all the grains are found substantially whole but in shapeless spongy masses, the structure of which is remarkably finely uniform and quite white and glossy throughout. The bran is, however, shelled off the grain and appears to be comminuted, so that the bulk of it is blown away when the chamber is opened, a small percentage only of it being found in the product.

It is found very desirable to evacuate air and also vapor evolved from water carried in the grain from the treatment chamber during the first period of the treatment, this evacuating operation occupying about five seconds, and the following cooking operation occupying about ten seconds.

It has been found preferable to produce the product from kiln dried wheat, the water necessary for cooking not present in the grain being provided by the steam in which the processing is conducted.

The temperature under which the treatment is effected will suffer some variation during the operation of the process, and will necessarily fall somewhat after the chamber has been opened, and will rise gradually during the time the chamber is closed, but the appropriate temperature for the processing of wheat is the temperature which exists within the chamber when the interior of the chamber can be observed as just visibly dark red, that is to between approximately 460° C.

and approximately 500° C. Any substantially higher temperature involves a risk of charring or singeing the wheat in treatment, whereas any substantially less degree of temperature does not procure in a complete way the changes in the wheat substance sought to be effected in the process.

The steam which is introduced into the chamber should be under pressure in the neighborhood of 1000 lbs. on the square inch, results varying in degree being obtained and the time of treatment necessary varying inversely as the temperature when pressures are used between about 700 lbs. on the one hand and 1500 lbs. on the other hand. A very high degree of superheat is necessary in order that the temperature within the chamber should not be reduced materially by reason of the introduction of the steam into it.

The apparatus for operating the process comprises a processing chamber with means for supplying heat to it, and mechanical devices for closing it and for opening it suddenly, and a source of superheated high pressure steam with means for introducing it into said chamber, means for evacuating gas and vapor from said chamber, and accessory mechanical devices, all of which are hereinafter described in detail.

In the accompanying drawings, Figure 1 is a plan view of the processing chamber, showing the mounting means and certain of the locking means for its closure;

Fig. 2 is a side elevational view of the same, certain portions being shown in section;

Fig. 3 is a fragmentary elevational view explanatory of the means for releasing the closure holding devices, thereby to liberate the chamber closure and permit it to be blown open by pressure of gas contained within the chamber;

Fig. 4 is a longitudinal vertical section, with the closure in locked position, set in readiness for introduction of superheated steam into the chamber;

Fig. 5 is a side sectional elevation corresponding with Fig. 2, showing the position of the closure locking parts when the chamber is open;

Fig. 6 is an enlarged front elevational view of the apparatus with the chamber closure open as in Fig. 5;

Fig. 7 is a fragmentary sectional elevation illustrating the detail of the mounting of the closure locking arms;

Fig. 8 is a semi-diagrammatic view showing the complete apparatus, including the means for supplying superheated steam to the processing chamber.

Throughout these drawings the same reference figures indicate identical or corresponding parts.

The treatment chamber or receptacle is most conveniently constructed as a cylindrical barrel 25, terminating at its rear end in a base block 13 which is bolted down to the frames 14—15 which are set up on a bed 16. The front end of the barrel 25 is fitted into a muzzle block 12 which is formed with integral yoke arms which are bolted down to the forward upper parts of the side frames 14—15, and with two heavy lug portions 29 which accommodate between them the lower portion of a hinge lug 27 on which the closure carrier 17 is fixed. A heavy pintle pin 28 is fixed in the lugs 29, and a slotted hole 40 in the lug 27 embraces the pin 28, the slotted form of the hole giving liberty to the carrier 17 to adjust itself slightly in relation to the chamber mouth. The carrier 17 is formed with a central cup seating 20 in which is set a spherical knuckle on the back of the chamber closure disk 18. The central portion of the disk 18 is extended beyond its rim portion 19 which is concentrically serrated on its face, and is tapered slightly to facilitate entry into the bore 26 of the barrel 25 and center the serrations 19 in relation to a gasket ring 24 of soft metal which is tightly fitted against the front end of the chamber barrel 25 within a circular seating formed by the muzzle block 12, so that when the closure is forced home a tight joint will be made capable of holding back a very high pressure of gas within the chamber. The knuckle mounting of the closure disk 18 enables it to set squarely against the gasket ring 24, notwithstanding that the carrier 17 is not in parallelism with it; and a check bolt 21 which has freedom of movement in a tapered hole in the carrier is provided to loosely retain the closure disk on the carrier. 22 are helical springs contained in pockets in the carrier and under tensional adjustment by back screws 23. These springs 22 bear against the closure disk 18 preventing any tumbling movement of it but leaving it free for self-adjustment against the gasket 24. The closure is held shut by a roller 41 carried on a yoke pin 42, the ends of which are mounted in two trace arms or anchor links 32. These arms or links 32 are pivotally carried at their rear ends on eccentric trunnion brushes 33 which are rotatable on trunnion pins 31 forming part of or fixed in the base block 13, 35 being a face washer, and 36 a fixing screw by which the washer 35 is held in contact with cheek portion 34 of the bush. The eccentric trunnion bush cheeks 34 are rearwardly extended to form arms 34$^x$ by swinging which the rotational position of the bushes on the trunnion pins is altered so as to virtually extend or shorten the arms or links 32. This adjustment movement of the arms 34$^x$ is effected by means of the jack screw 38 which works through a tapped hole in the yoke pin 37 which connects them. The footstep of the jack screw bears in a seating in the table 39 which forms a connecting member for the under frame, and has a check screw below said footstep to prevent it from coming out of said seating. The rotational adjustment of the eccentric bushes 33 is such that the roller 41, when the arms 32 are raised and the closure disk forced tightly home, will be on the ramp faces 43 directly rearward of the cup bearing 20 in which the closure disk 18 is seated. Internal pressure in the chamber acting against the closure disk is thus directly resisted by the links 32, and said links are raised and held in the upraised position, forcing the roller 41 against the ramp faces 43 and holding it there by means of the lifting and locking means associated with the lifting gear next to be described.

Between the muzzle block 12 and the base block 13 the chamber barrel is sheathed with mica or other electrical insulating material capable of withstanding high temperatures, and upon this sheathing is wound a coil 70 of resistance wire, the terminals 71—72 of which are brought out through a heavy jacketing 73 of heat insulating material, such as asbestos. The convolutions of the coil 70 must be efficiently protected, in the manner well known in electrical practice, against risk of short circuit. The terminals 71—72 are connected to a source of electrical current through a switch 83. The dimensions of the coil 70 are proportioned in relation to the current values, so that they will operate to maintain the chamber barrel 25 at the appropriate temperature.

In practice, the barrel 25 may be of any reasonable dimensions, but should be of limited size, having regard to the high pressure to which it is subjected in use. I have obtained successful results with barrel like chambers, similar to that illustrated, having diameters varying from three inches to upward of six inches and a length of six feet.

Particularly for chambers of a large type, the weight of the closure disk and its mounting and operating mechanism is so considerable that it is not practicable to move them manually, and mechanical means are therefore provided for this purpose. A plunger 64 carried in a hydraulic cylinder 63 is provided to effect the lifting movement. It may be keyed against rotation in the cylinder 63 by a fixed pin 66 working in a slot 65. The head 67 of the plunger takes against the underside of the lifting yoke member 44, the two lugs of which are respectively connected to the arms or links 32 by means of pins 111 working in slotted eyes 112 in said links. 45 are heavy helical springs carried on the yoke member 44 and positioned so that their top ends will abut against the foot piece 30 of the muzzle block 12 when the plunger 64 is moved upward sufficiently to lift the arms 32 to the position shown in Fig. 4. These springs operate to force the yoke down very rapidly from the upper position indicated in Fig. 4 to the lower position indicated in Fig. 5 as soon as the locking device which holds it in the upper position has been released. The locking device by which the lifting yoke 44 and the parts sustained by it are held consists of two horizontally swinging chocking beams 49 mounted on pins 51 carried in brackets 50 on the frame cheek 14. These chocking beams 49 coact with the latch lugs 46 on the yoke member 44, spreading apart to allow said lugs 46 to pass upward between them, and immediately closing together below said lugs when same pass above them, thereby to block the yoke from moving downward again until they are positively spread apart by operating the releasing gear. They are normally held inward in locked position by two helical springs 53 which are mounted in a carrier frame 52, and they are guided laterally by slots 54 in the side frame member 15 through which they pass. Upon a spindle 56 mounted on the frame member 15 a cam 55 is keyed. This cam is shaped and proportioned so that when it is in one certain position (Fig. 2) the chocking beams 49 will come to the inward position, while when it is turned to a position angular thereto the chocking beams 49 will be spread apart to offer clearance for the latch lugs 46, thereby to allow the springs 45 to react and suddenly force down the yoke, withdrawing the roller abutment 41 from the back of the closure disk carrier, so releasing the closure and allowing it to be blown open by the gaseous pressure contained within the treatment chamber. The cam 55 is rotated to spread the chocking beams 49 apart by the upward movement of a plunger 61 working in a cylinder 62, oil or water pressure being supplied to said cylinder to force said plunger upward at the appropriate moment to effect release of the chamber closure. The plunger carries a rack 60 which gears into a pinion 59 fixed or cut on a lateral extension of the cam 55. The cam and the plunger 61 are reset in the low position manually by means of a hand crank applied to the squared end 57 of the spindle.

100 is an accumulator adapted for carrying water or oil under high pressure. 87 is a drain box at the foot of the gage, and 101 is a piping T connection. 97 is a pump for forcing oil or water into said accumulator 100. 99 is a control valve or check valve in the connecting service pipe 98. Water or oil from the accumulator 100 is conveyed through the pipe line 78, which includes a control valve 102, a gage 103, and a relief valve 79, to the cylinder 63. 80 is the evacuating pipe from said cylinder 63, and 104 is a valve thereon. The valves 102—104 are preferably interlocked. Pressure liquid is taken from the accumulator 100 through the pipe line 81, including the control valve 105 and the gage 106, to the lock releasing cylinder 62, and liquid is evacuated from said cylinder through the pipe 82 and the control valve 107, the valves 105–107 being preferably interlocked. 95 is a water sump, 94 is a pipe therefrom to the water cylinder 93 of a steam pump 91—93, the steam cylinder 91 of which is supplied with steam from any appropriate source through a pipe 92. Water is supplied at a uniform rate from the pump cylinder 93 through the pipe line 96 into the coils of the flash boiler 90, in which said water is converted to steam and the steam highly superheated. The superheated steam passes by the pipe line 76 and the control valve 89 to the breach hole 74 in the base block 13: 88 being a pressure indicator. 77 is an evacuating pipe connecting through the muzzle block 12 into the bore of the treatment chamber. 84 is a control valve in said pipe line, and 86 is another control valve at the tail end of said pipe line. The end portion of the evacuating pipe 77 may be coiled in the uptake 85 of the boiler flue, so that the waste gases and vapors may absorb heat from said flue when they are utilized for preheating water for the generator which supplies the pump 91, or for any other purpose.

110 is a thermometer having its bulb set in a cup 109 at the head of a copper rod which is wrapped in heat insulating material and is tapped at the foot into the metal substance of the chamber 25. The thermometer scale is marked after test to indicate the temperature existing within the chamber.

The operation of the apparatus is as follows: The chamber being opened, as seen in Figs. 1, 2, 5, and 6, is heated up by passing electrical current through the wire coils 70 until the interior of the chamber shows just visibly a dark red color. A charge 108 of wheat which has not been subjected to any preliminary treatment, except superficial cleaning when such cleaning is thought desirable, is now introduced into the chamber so as to occupy from half to three-fourths its capacity. The charge should be introduced quickly by any convenient loading instrument in order that portions of the grain will not be exposed for an unduly long period to the high temperature condition existing within the chamber. Pressure liquid from the accumulator 100 being now admitted to the plunger cylinder 63, the plunger 64 is forced upward, raising the yoke 44, and through it the arms 32, thus swinging up the carrier 17 and bringing the closure disk 18 against the grometed muzzle of the chamber. In this upward movement the latch lugs 46 on the yoke member 44 are forced upward, spreading the chocking beams 49 apart until the underfaces of said lugs 46 come level with the top plane of the chocking beams 49. Immediately this position is attained, the beams 49 are moved inwardly by the springs 53 and take under the latch lugs 46 as shown in Figs. 4 and 8, thus locking the yoke and the parts sustained by it against downward movement. In this upward movement, the springs 45 are compressed against the abutment member 30 below the muzzle block. To set the parts ready for discharge at a later stage, the water pressure in the cylinder 63 is released so that the plunger 64 comes down to the position shown in Fig. 3. The valve 84 being now opened, superheated steam is admitted to the chamber 25 by the pipe line 76, by operating the valve 89, the valve 86 being at this time closed. Almost immediately after the valve 89 has been opened to admit steam to the chamber 25 the valve 84 is closed, but sufficient time has elapsed in the two or three seconds interval to allow most of the air and a considerable portion of the vapor evolved from the wheat to be evacuated from the chamber through the pipe 77. The supply of superheated steam through the valve 89 is continued for a period not exceeding in all about fifteen seconds, results varying in degree being found in superheated steam treatment ranging between ten seconds and twenty seconds. A period of treatment of thirty seconds or more is excessive and would produce a charred and totally useless product. Finally the valve 86 is opened and the superheated steam which is emitted through it is condensed and utilized according to requirements. Simultaneously, or almost so, with the closing of the valve 89 the valve 105 is operated to admit pressure liquid from the accumulator 100 into the cylinder 62, the upward movement of the rack 60 immediately reversing the position of the cam 55, thus moving apart the chocking beams 49 which sustained the yoke member 44 and through it held the chamber closure assembly locked. The springs 45 then reacting, force the yoke 44 suddenly downward. As soon as the downward movement commences, it is assisted by the opening tendency of the carrier 17 which is forced downward by the gaseous pressure within the chamber, so that a very rapid opening of the chamber takes place; the whole of the grain contained in the chamber being immediately ejected and dispersed in the atmosphere in the front and about the front of the chamber, and the closure disk and carrier being brought to rest on the abutment roller 41. To facilitate collection of the product, an appropriate coarse gage screen should be erected around the front of the chamber, so that the ejected product will be caught in said screen and may then be readily collected. The rapid downward movement of the yoke 44 in this opening action is buffered on the springs 69. 47 are guide lugs, and 48 guide pins therein for carrying the yoke 44 into the required plane during its vertical movement in the shutting and opening of the chamber closure.

That the electrical heating chamber device by which the temperature within it is maintained about the required point, while the most convenient device known to me for that purpose, is not the only device which may be so used. For instance, the chamber 25 may be placed in the flue of a furnace which is provided with appropriate thermostat controlled dampers to insure uniformity of temperature, or it may be heated by gas flames acting externally upon it.

What I claim as my invention and desire to secure by Letters Patent is:—

1. A completely cooked food product substantially dry but liquescent in water and free from light polarizing characteristics, consisting of unmilled wheat grains, expanded to irregular shapeless masses and having the cells burst and the cell structure shattered.

2. A completely cooked food product substantially dry but liquescent in water and free from light polarizing characteristics, consisting of unmilled wheat grains, spread open along the crease, and having the cells burst and the cell structure shattered.

3. A completely cooked food product substantially dry but liquescent in water and free from light polarizing characteristics, consisting of unmilled wheat grains, spread open along the crease, expanded to irregular shapeless masses, and having the cells burst and the cell structure shattered.

4. A food product consisting of whole wheat grains cooked to a substantially dry condition, having the starch cells burst, the cell structure shattered, and the mass expanded shapelessly.

5. A food product consisting exclusively of the substance of wheat grains in substantially dry condition, completely cooked, and having the cells burst and the cell structure shattered.

6. A process of cooking whole wheat grain which consists in submitting it to a temperature of approximately 460° C.–500° C. for a period of approximately a quarter of a minute in the presence of highly superheated steam under a pressure of the order of one thousand pounds on the square inch.

7. A process of cooking whole wheat grain which is characterized in that the grain without previous drying or other treatment is completely cooked in a chamber charged with superheated steam for a period of approximately a quarter of a minute under a temperature of the order of 460° C.–500° C. and under a pressure of the order of 1000 lbs. per square inch, and is liberated from said chamber by suddenly opening said chamber while it is under pressure.

8. A process according to claim 7, wherein vapor and air are expelled from the treatment chamber by displacement with superheated steam during the beginning of the treatment period.

In testimony whereof I have signed my name to this specification.

CHARLES VICTOR ROWELL.